US012656011B2

(12) United States Patent
Bistany et al.

(10) Patent No.: US 12,656,011 B2
(45) Date of Patent: Jun. 16, 2026

(54) AIR-QUALITY MONITORING DRIVEN BUILDING SYSTEM CONTROL

(71) Applicant: ZEPTIVE, INC, Andover, MA (US)

(72) Inventors: Loucinda C. Bistany, Metheun, MA (US); William D. Hargett, Chelmsford, MA (US); Stephen S. Milt, Winchester, MA (US)

( * ) Notice: Subject to any disclaimer, the term of this patent is extended or adjusted under 35 U.S.C. 154(b) by 590 days.

(21) Appl. No.: 18/072,480

(22) Filed: Nov. 30, 2022

(65) Prior Publication Data

US 2023/0167997 A1 Jun. 1, 2023

Related U.S. Application Data

(60) Provisional application No. 63/284,609, filed on Nov. 30, 2021.

(51) Int. Cl.
*F24F 11/65* (2018.01)
*G05B 13/02* (2006.01)
*G05B 15/02* (2006.01)
*F24F 110/64* (2018.01)
*G08B 21/18* (2006.01)

(52) U.S. Cl.
CPC .......... *F24F 11/65* (2018.01); *G05B 13/0265* (2013.01); *G05B 15/02* (2013.01); *F24F 2110/64* (2018.01); *G08B 21/182* (2013.01)

(58) Field of Classification Search
CPC ........ F24F 11/62; F24F 11/64; F24F 2110/50; F24F 2110/66
See application file for complete search history.

(56) References Cited

U.S. PATENT DOCUMENTS

| | | | | |
|---|---|---|---|---|
| 11,030,877 | B2 * | 6/2021 | Bistany | G08B 21/182 |
| 11,913,931 | B2 * | 2/2024 | Bistany | G01N 33/0065 |
| 2018/0119973 | A1 * | 5/2018 | Rothman | F24F 11/62 |
| 2019/0277822 | A1 * | 9/2019 | Chadha | G01N 33/0031 |
| 2020/0240668 | A1 * | 7/2020 | Bassa | F24F 11/64 |
| 2020/0394886 | A1 * | 12/2020 | Antar | G08B 17/10 |
| 2021/0018210 | A1 * | 1/2021 | Nasis | F24F 11/65 |
| 2022/0054687 | A1 * | 2/2022 | Forzani | A61L 2/22 |
| 2022/0154956 | A1 * | 5/2022 | Maruyama | F24F 11/52 |
| 2022/0192454 | A1 * | 6/2022 | Viengkham | A47L 11/4011 |
| 2022/0404056 | A1 * | 12/2022 | Bloemer | F24F 11/58 |
| 2023/0168648 | A1 * | 6/2023 | Timmins | G05B 19/042 700/276 |

* cited by examiner

*Primary Examiner* — Mohammad Ali
*Assistant Examiner* — Vincent W Chang

(57) ABSTRACT

An air quality monitoring system integrated with the building management system observes and records air quality data and building system data. Based on the observed air quality data and building system data, one or more training data sets can be generated. Such training data sets are used to train one or more machine-learning models configured to determine one or more threshold values for the air quality. These thresholds are then used to modify or adjust one or more building systems based on monitored air quality data.

17 Claims, 5 Drawing Sheets

200

300

Record Sensor Unit Data — 305

Train Machine-Learning Model — 310

Determine One or More Thresholds — 315

Monitor Air Quality — 320

One or more Thresholds Exceeded? — 325

No

Yes

Adjust, Modify, or Activate Building System — 330

400

405 — Record Sensor Unit Data

410 — Classify Data

415 — Perform One or More Machine-Learning Algorithms

425 — Store Trained Machine-Learning Model

AIR-QUALITY MONITORING DRIVEN BUILDING SYSTEM CONTROL

CROSS-REFERENCE TO RELATED APPLICATIONS

This application claims the benefit of priority to U.S. Provisional Patent Application Ser. No. 63/284,609 filed on Nov. 30, 2021 and entitled "AIR-QUALITY MONITORING DRIVEN BUILDING SYSTEM CONTROL," the entirety of which is incorporated by reference herein in its entirety.

FIELD OF INVENTION

The present invention relates generally to building systems and air quality management. In particular, the present invention is directed to systems and methods for predictive building system management according to historical air quality.

BACKGROUND

Air quality detection systems are used in environments to monitor and detect potentially dangerous or harmful airborne substances. Such systems are dedicated to detecting specific substances and do not allow for the easy adjustment, refinement, or modification of threshold values. As such, these systems take a one-size-fits all approach, potentially reducing the efficiency of building systems integrated with these air quality detection systems. Additionally, these systems only allow for a few responses which may cause excess wear and tear on unnecessary building systems used in these responses. Over time, such wear and tear will lead to increased maintenance fees and decreased efficiency for these building systems.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings.

DETAILED DESCRIPTION

Systems and techniques described herein are directed to managing one or more building systems according to current air quality data. In particular, a building management system configured to manage one or more building systems of an environment is integrated with an air quality monitoring system. The air quality control system monitors at least a portion of the environment and measures a particle count of one or more aerosolized substances of interest. In response to the particle count of one or more substances of interest exceeding threshold values, one or more building systems are adjusted. In this way, hazards presented by the substances of interest are mitigated.

Additionally, systems and techniques described herein are directed to managing one or more building systems based on one or more sets of historical air quality data. In particular, the air quality monitoring system integrated with the building management system observes and records air quality data to produce sets of historical air quality data. Based on the sets of historical air quality data, one or more training data sets are generated. Such training data sets are used to train one or more machine-learning models configured to determine one or more baseline values, threshold values or mitigation actions used to monitor, modify, or adjust one or more building systems. In this way, building systems may more efficiently maintain a desired air quality.

Figure 1:
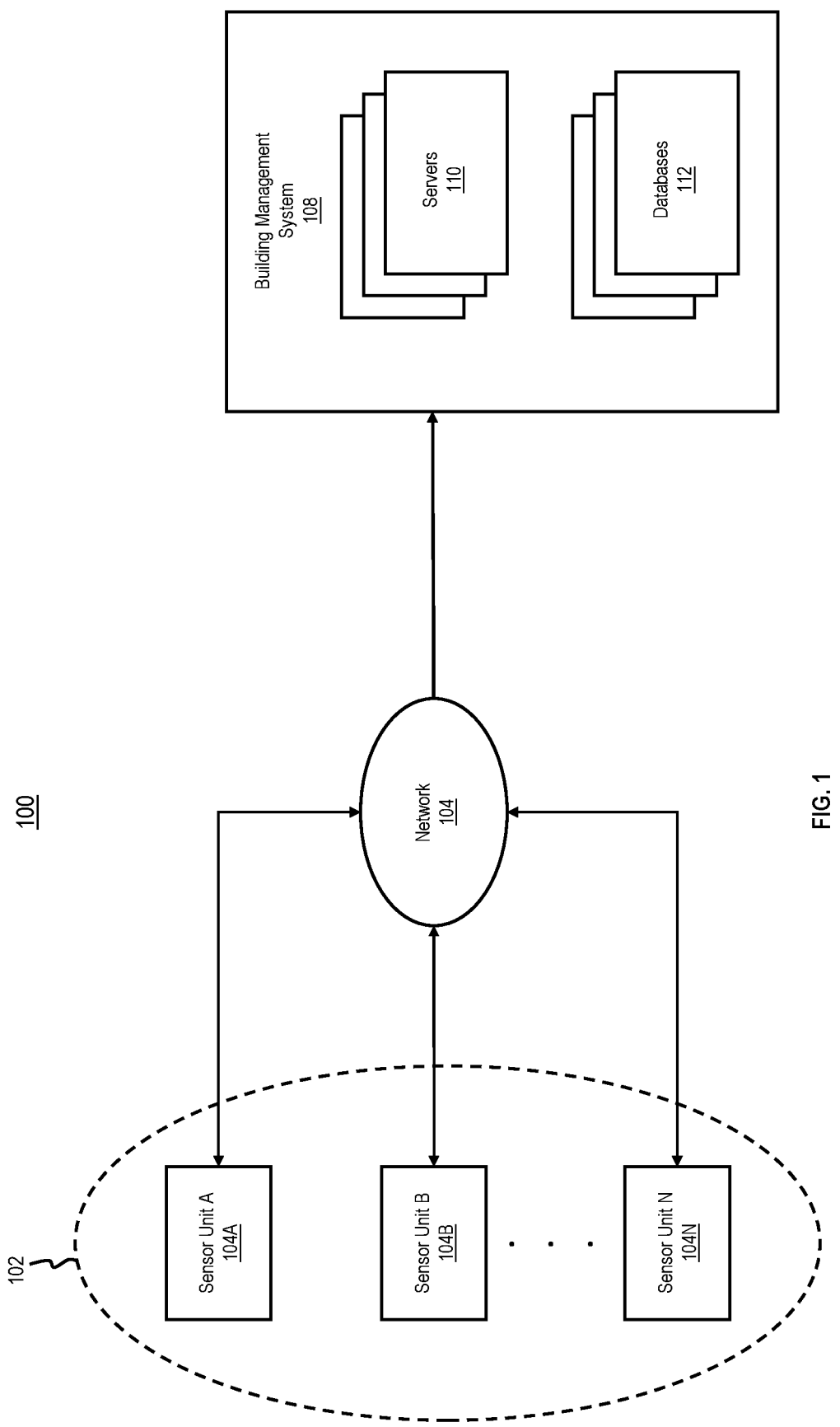
FIG. 1 illustrates a block diagram of an air quality detection system integrated with a building management system, according to embodiments.

Referring now to FIG. 1, a block diagram of an integrated system 100 for building management based on air quality is illustrated. According to embodiments, integrated system 100 is configured to manage one or more building systems (e.g., security systems, alarm systems, HVAC systems, fire systems, electrical systems, telecom systems, utilities systems) of an environment (e.g., a school, an office building, a residence, a dormitory, a warehouse, a factory, a laboratory, a hospital) based on the air quality of at least a portion of an environment. A portion of an environment includes, for example, any portion of a room, floor, level, wing, or building of an environment. As an example, a portion of the environment includes a hallway of a floor of an environment. In embodiments, integrated system 100 is configured to measure the air quality of one or more portions of the environment using air quality monitoring system 102. Air quality monitoring system 102 includes one or more sensor units 104 configured to monitor air quality of one or more portions of an environment.

According to embodiments, each sensor unit 104 (e.g., air quality sensor) includes a sensor suite that includes, for example, one or more particle sensors, chemical sensors, temperature sensors, humidity sensors, or any combination thereof. Each sensor unit (e.g., air quality sensor) comprises a "detection unit" as disclosed in commonly owned U.S. Pat. Nos. 11,030,877 and 11,195,406, both of which are incorporated by reference in their entirety herein. In embodiments, each sensor unit 104 is configured to detect one or more substances of interest in at least a portion of an environment. A "substance of interest," as used herein, includes one or more airborne gases, and/or particles that are to be monitored in at least a portion of an environment. As one example, substances of interest can include substances that are illegal, prohibited, or discouraged within environment 102, and include, for example, emissions from a vaporization device (e.g., nicotine vaping device, cannabinoid vaping device, tetrahydrocannabinol vaping device), emissions from nicotine products (e.g., cigarettes, cigars, pipes), emissions from illegal, prohibited, or discouraged drugs (e.g., methamphetamine, fentanyl), or any combination thereof. As another example, substances of interest include one or more hazardous substances, for example, emissions from chemical spills (e.g., dimethyl sulfate, toluene diisocyanate), hazardous gasses (e.g., arsine, dimethyl sulfate, toluene, hydrogen azide, hydrogen cyanide, nitrogen dioxide, ammonia), biological substances (e.g., viruses, bacteria, fungus, mold), or any combination thereof. As yet another example, substances of interest can include discouraged substances, for example, animal odors (e.g., animal urine, animal feces, animal sweat), chemical odors (e.g., perfumes, colognes, body sprays), food odors, or any combination thereof. In embodiments, substances of interest include aerosolized particles, droplets, gasses, or any combination thereof. According to embodiments, one or more sensor units 104 (e.g., air quality sensors) include a weather engine (not shown for clarity). A weather engine includes hardware and software configured to determine weather conditions (e.g., precipitation chance, rainfall amounts, wind speed, humidity index) at one or more portions of an environment at one or more times. For example, a weather engine is configured to access one or more databases to determine one or more weather conditions at or near one or more portions of the environment. As another example, a weather engine is configured to access one or more weather services to determine predicted weather conditions for one or more portions of the environment at one or more times.

In embodiments, each sensor unit 104 (e.g., air quality sensor) includes one or more chemical sensors. Each chemical sensor is configured (e.g., calibrated) to detect the presence of one or more predetermined substances of interest proximate to the chemical sensor. That is to say, each sensor unit 104 includes one or more chemical sensors configured to monitor the portion of the environment proximate to the sensor unit 104, for example, a room, hallway, or portion of a warehouse. According to embodiments, each chemical sensor includes one or more spectroscopy sensors, capacitive sensors, spectrometers (e.g., ion mobility spectrometers, mass spectrometers), chemiresistors, lasers, electrochemical sensors, biosensors, or any combination thereof. In response to detecting the presence of one or more predetermined substances of interest, each chemical sensor is configured to generate a detection signal. Such a detection signal, for example, includes data indicating the presence of a substance of interest in a portion of the environment. For example, a detection signal includes data identifying the substance of interest, data identifying the portion of the environment in which the substance of interest was detected, data indicating a location within the portion of the environment, a timestamp, or any combination thereof. In embodiments, each chemical sensor is further configured to detect a particle count or particle density of a detected substance of interest. In some embodiments, each chemical sensor compares the particle count or particle density to a predetermined substance threshold value. A substance threshold value, for example, includes one or more threshold particle counts or particle densities associated with a substance of interest. In response to the particle count or particle density exceeding the predetermined substance threshold value, a chemical sensor is configured to generate a detection signal. According to embodiments, one or more chemical sensors are configured to continuously monitor a portion of an environment. For example, a chemical sensor may be configured to continuously monitor a portion of an environment when it is powered by, for example, a generator, wall outlet, grid, or any combination thereof. In embodiments, one or more chemical sensors are configured to monitor a portion of an environment in response to an activation event, for example, a manual activation of the chemical sensor, movement in the portion of the environment, an activation event, an interaction with one or more building systems, or any combination thereof. A chemical sensor may be configured to monitor a portion of an environment in response to an activation signal when it is powered by, for example, a battery, a generator, or a combination of the two. According to embodiments, one or more chemical sensors are configured to monitor a portion of an environment periodically, for example, at predetermined intervals of time such as seconds, minutes, hours, days, weeks, months, or any combination thereof. A chemical sensor may be configured to monitor a portion of an environment periodically when it is powered by, for example, a battery, a generator, or a combination of two.

In embodiments, air quality monitoring system 102 is communicatively coupled to building management system 108 by network 104. Communicatively coupled, for example, includes the capability of transferring or receiving data using one or more communication protocols (e.g., TCP, UDP, POP, SMTP, IP, HTML, FTP, BACnet, BACnet Secure Connect, Modbus, Internet Technologies/Protocols, LonWorks, Common Industrial Protocol, Telnet, Bluetooth, Bluetooth LTE, Zigbee, or any combination thereof, to name a few). Network 104 includes one or more wired and wireless connections configured to communicatively couple air quality monitoring system 102 to building management system 108 and includes, for example, the Internet, LAN, ad-hoc connections, Bluetooth, RFID, NFC, Ethernet, Intranet, Wi-Fi, cellular networks (e.g., 4G, 5G), Piconet, or any combination thereof. According to embodiments, air quality monitoring system 102 is configured to send one or more detections signals, detected particle counts, detected particle densities, or any combination thereof, from one or more sensor units 104 to building management system 108 via network 104.

Building management system 108 is configured to control, activate, power, modify, or shut down one or more building systems of the environment. For example, building management system 108 is configured to activate one or more HVAC systems. In embodiments, building management system 108 includes one or more servers 110 (e.g., virtual servers, cloud-based servers), computing devices, user devices (e.g., tablets, smartphones, laptops) each communicatively coupled to one another by network 104. According to embodiments, building management system 108 is configured to control, activate, power, modify, or shut down one or more building systems associated with a portion of an environment based on one or more detection signals, detected particle counts, detected particle densities, or any combination thereof received from air quality monitoring system 102. As an example, a building system associated with a portion of an environment includes a building system that affects the portion of the environment, for example, the air, structures, power, alarms, or security, within the portion of the environment. In embodiments, in response to receiving one or more detection signals, detected particle counts, detected particle densities, or any combination thereof, building management system 108 is configured to generate a mitigation action. Such a mitigation action, for example, includes the activation, deactivation, or modification of one or more building systems that are capable of addressing the substance of interest indicated by one or more received detections signals, detected particle counts, and detected particle densities. For example, a mitigation action includes activating a HEPA filter at a portion of the environment to address the presence of a contagion indicated by a detection signal. In embodiments, a mitigation action comprises one or more user prompts to be displayed. For example, a user prompt to open a window. As another example, a user prompt to turn on at least a portion of an HVAC system (e.g., fan, air filter).

In embodiments, building management system 108 is configured to store one or more received detection signals, detected particle counts, detected particle densities, or any combination thereof received from air quality monitoring system 102 in databases 112. Databases 112 include hardware and software configured to store and manage one or more sets of historical air quality data such as one or more processing cores, microcontrollers, memories, or any combination thereof. Sets of historical air quality data include previously received detection signals, detected particle counts, detected particle densities, or any combination thereof stored in databases 112. According to embodiments, databases 112 are configured to associate each received detection signal, detected particle count, and detected particle density with data associated with their creation to form one or more sets of historical air quality data. Such data includes the time, location, and substance of interest associated with the creation of the detection signal, detected particle count, or detected particle density. As an example, databases 112 form a set of historical air quality data by associating one or more detection signals, detected particle counts, detected particle densities, or any combination thereof with one or more same or similar times and locations. In embodiments, building management system 108 is configured to send sets of historical air quality data stored in databases 112 to at least one other building management system and to receive sets of historical air quality from at least one other building management system.

For example, in embodiments, databases 112 receive one or more sets of historical air quality data and one or more labels from one or more building management systems. Such labels, for example, include data defining, classifying, grouping, or any combination thereof, one or more pieces of data from a set of historical air quality data. As an example, a database 112 receives, from a building management system, a set of historical air quality data including data representing previously received particle counts and particle densities for one or more portions of an environment. Additionally, the database 112 receives one or more labels classifying each particle count and particle density as baseline, non-harmful, and harmful. A baseline classification, for example, indicates that a particle count, particle density, or both for a respective substance is an ambient (e.g., base) count or density for that substance in a portion of an environment. A non-harmful classification, for example, indicates that a particle count, particle density, or both for a respective substance is at a non-harmful count or density (e.g., below a substance threshold) for that substance in a portion of an environment. Further, a harmful classification, for example, indicates that a particle count, particle density, or both for a respective substance is at a harmful count or density (e.g., above a substance threshold) for that substance in a portion of an environment. In embodiments, such labels are generated and assigned to detection signals, particle counts, particle densities, or any combination thereof, of a set of historical air quality data by one or more servers 210 implementing one or more machine-learning models (e.g., on machine-learning engine 218). In other embodiments, one or more users input and assign such labels using one or more graphical user interfaces (GUIs) running one or more servers 210, computers, user devices, or any combination thereof.

In embodiments, building management system 108 is configured to determine one or more baseline values based on one or more sets of historical air quality data. Such baseline values, for example, include data representing one or more ambient (e.g., baseline) particle counts, particle densities, or both for one or more substances within a portion of an environment. For example, baseline values include an ambient particle count and ambient particle density for a respective substance within a portion of an environment when there are no emissions from any products or devices (e.g., a vaporization device, nicotine products) in the portion of the environment. To determine the baseline values, building management system 108 is configured to determine one or more means, medians, modes, patterns, sequences, rate, or trends in one or more sets of historical air quality data. For example, determining a predetermined substance threshold value includes determining an average particle count and particle density of a substance in an environment over time. Additionally, building management system 108 is configured to determine one or more baseline values based on one or more labels associated with a set of historical air quality data. As an example, building management system 108 is configured to filter, arrange, weight, or any combination thereof, data within a set of historical air quality data based on one or more labels associated with the set of historical air quality data. In embodiments, building management system 108 includes one or more machine-learning models, machine-learning algorithms, or artificial neural networks configured to determine one or more baseline values for one or more respective substances in an environment.

According to embodiments, building management system 108 is configured to determine one or more substance threshold values based on historical air quality data. That is to say, building management system 108 is configured to determine one or more threshold particle counts or particle densities associated with a substance of interest based on one or more sets of historical air quality data. In embodiments, determining predetermined substance threshold values includes determining one or more means, medians, modes, patterns, sequences, rate, or trends in one or more sets of historical air quality data. For example, determining a predetermined substance threshold value includes determining an increased rate in the presence of a substance of interest at a certain portion of the environment from one or more sets of historical air quality data. Additionally, building management system 108 is configured to determine one or more substance threshold values based on one or more labels associated with a set of historical air quality data. As an example, building management system 108 is configured to filter, arrange, weight, or any combination thereof, data within a set of historical air quality data based on one or more labels associated with the set of historical air quality data. According to embodiments, building management system 108 includes one or more machine-learning models, machine-learning algorithms, or artificial neural networks configured to determine one or more predetermined substance threshold values based on historical air quality data.

In embodiments, databases 112 further is configured to store historical mitigation data. Historical mitigation data includes mitigation actions previously generated by one or more building management systems 108. Databases 112 are configured to associate mitigation actions in historical mitigation data with the time, location, and substance of interest associated with the creation of the mitigation action. In embodiments, building management system 108 is configured to send historical mitigation data stored in databases 112 to at least one other building management system and to receive historical mitigation data from at least one other building management system. According to embodiments, building management system 108 is configured to determine one or more mitigation actions according to the historical mitigation data stored in databases 112. In embodiments, determining a mitigation action includes determining one or more means, medians, modes, patterns, changes, sequences, rates, or trends in a historical air quality data, the historical mitigation data, or any combination thereof. For example, determining a mitigation includes determining a change in the particle count of a contagion after a certain mitigation action. According to embodiments, building management system 108 includes one or more machine-learning models, machine-learning algorithms, or artificial neural networks configured to determine one or more mitigation actions based on historical air quality data, historical mitigation data, or both.

Figure 2:
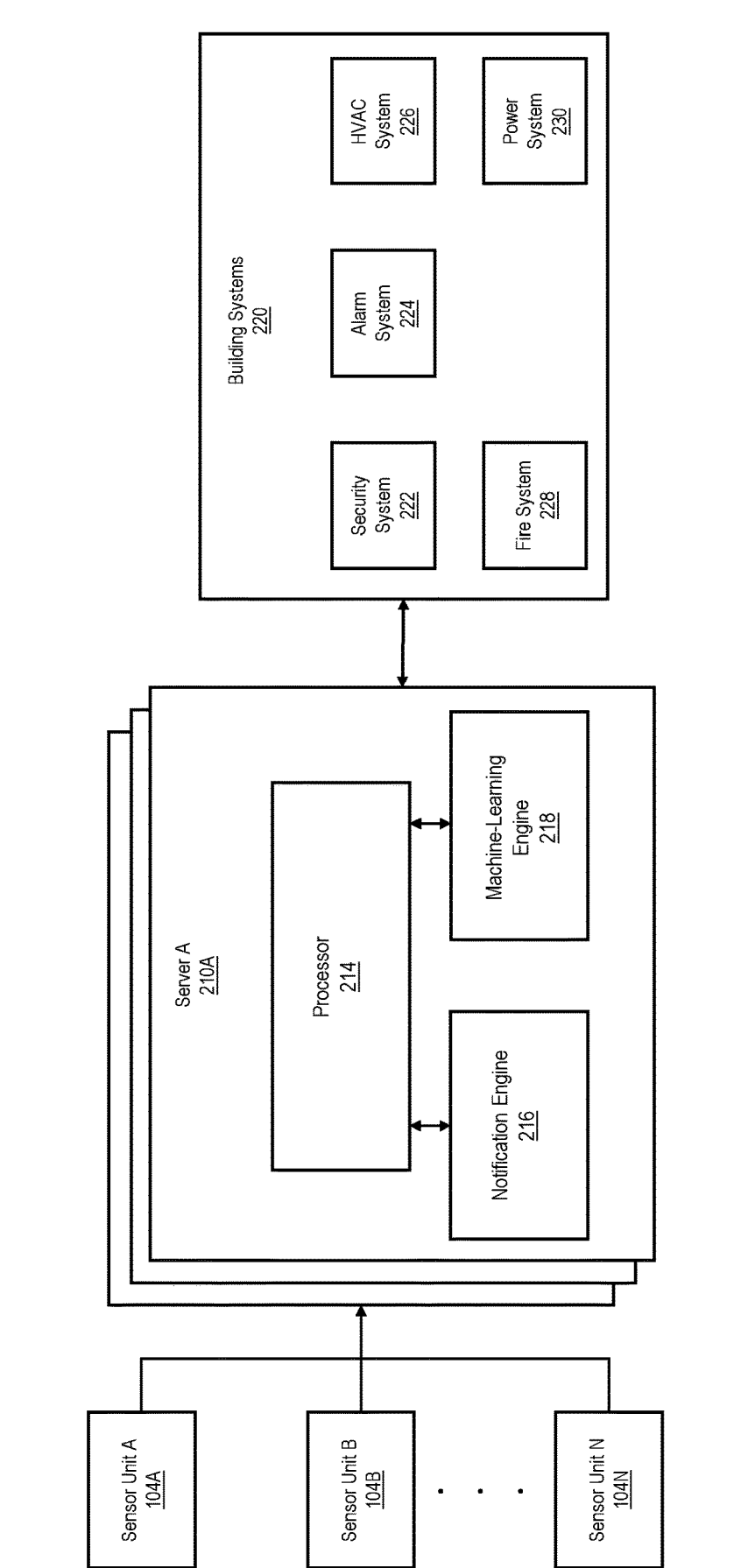
FIG. 2 illustrates a block diagram of a predictive building management system, according to embodiments.

Referring now to FIG. 2, a predictive building management system 200, the same as or similar to building management system 108, configured to control, activate, power, modify, or shut down one or more building systems 220 is presented. Building systems 220 include one or more building systems each associated with one or more areas of an environment. For example, building systems 220 include a building system associated with a hallway of an office building, a classroom, a warehouse floor, or any combination thereof, to name a few. According to embodiments, building systems 220 include, for example, security system 222, alarm system 224, heating, ventilation, and air conditioning ("HVAC") system 226, fire system 228, power system 230, or any combination thereof. A security system includes one or more systems, sensors, or computing devices configured to monitor one or more portions of an environment. For example, a security system 222 includes sensors and computing devices configured to detect intruders and/or threats within one or more portions of an environment. According to embodiments, a security system 222 includes one or more systems, sensors, or computing devices configured to grant and deny access to one or more portions of the environment. In embodiments, security system 222 includes one or more cameras, surveillance systems, audio recorders, or any combination thereof, configured to capture video and audio of one or more portions of the environment. An alarm system includes one or more systems, sensors, or computing devices configured to trigger, power, and/or cease one or more audible (e.g., siren, klaxon, bells, etc.), visual (lights, strobes, LEDs, display patterns, etc.), or tactile (vibrating alarms, motors, etc.) alarms located at one or more portions of an environment. An HVAC system includes one or more systems, sensors, or computing devices configured to control, power, or modify the climate control, air filtration, heating, cooling, air scrubbing, exhaust, air circulation, humidity, temperature, or any combination thereof, of one or more portions of an environment. For example, HVAC system 226 includes systems, sensors, and computing devices to control the filtration of odors, smoke, chemicals, contagions, bacteria, gasses, and/or any substance of interest discussed above with reference to FIG. 1 in one or more portions of the environment. As another example, HVAC system 226 includes one or more systems, sensors, or computing devices configured to filter substances from at least a portion of an environment by activating or modifying the operation of one or more fans, ultraviolet light filters, high efficiency particulate air (HEPA) filters, electrostatic filters, washable filters, pleated filters, spun glass filters, media filters, forced-air systems, exhaust systems, or any combination thereof.

A fire system includes one or more systems, sensors, or computing devices configured to control one or more fire prevention, fire suppression, and/or fire alarm systems of one or more portions of an environment. For example, fire system 228 includes one or more systems, sensors, or computing devices configured to control one or more smoke detectors, heat sensors, infrared sensors, carbon monoxide detectors, sprinklers, alarms, fire extinguishers, or any combination thereof. In embodiments, fire system 228 is configured to contact one or more emergency services (e.g., fire department, police department, emergency medical technicians, etc.), such as when a fire is detected. A power system includes one or more systems, sensors, or computing devices configured to control electrical power to one or more portions of an environment. Power system 230 may be configured to control, activate, or modify one or more electric meters, electrical generators, lighting systems, elevator systems, electrical circuits, backup power systems, emergency lighting systems, or any combination thereof, to name a few.

According to embodiments, building management system 200 includes one or more servers 210 configured to control, activate, power, modify, or shut down one or more building systems of building systems 220. Each server 210 includes, for example, a computing device, a microcontroller, microprocessor, digital signal processor (DSP) and system on a chip (SoC), or any combination thereof as described in this disclosure. Each server 210 includes, is included in, or is otherwise communicatively coupled with a user device such as a mobile telephone or smartphone. Each server 210 includes a single computing device operating independently, includes two or more computing devices operating in concert, in parallel, sequentially or the like. In embodiments, two or more computing devices are included together in a single computing device or in two or more computing devices. One or more servers 210 interface or communicate with one or more additional devices or servers via a network interface device. Examples of a network interface device include, but are not limited to, a network interface card (e.g., a mobile network interface card, a LAN card), a modem, and any combination thereof. In embodiments, each server includes a processor 214 configured to control, activate, power, modify, or shut down one or more building systems of building systems 220. For example, a processor 214 of a server 210 transmits data representing one or more messages, commands, instructions, or any combination thereof to control, activate, power, modify, or shutdown one or more building systems 220. In some embodiments, one or more servers 210 are stored at one or more portions of the environment, one or more servers are stored at a location remote from the environment, or a combination of the two. Though in the illustrated embodiment of FIG. 2 three servers (210A, 210B, and 210C) are presented to control, activate, power, modify, or shut down one or more building systems of building systems 220, in other embodiments, any number of servers may be used.

In embodiments, one or more servers 210 are configured to receive one or more detection signals, detected particle counts of one or more substances of interest, detected particle densities of one or more substances of interest, or any combination thereof, associated with one or more portions of an environment from sensor units 104 of air quality monitoring system 102. As discussed above with reference to FIG. 1, each sensor unit detects particle counts and particle densities for one or more substances of interest in one or more portions of the environment and generates one or more detection signals based on the detected particle counts and particle densities. According to embodiments, one or more servers 210 are configured to control, activate, power, modify, or shut down one or more building systems of building systems 220 based on one or more detections signals, detected particle counts of one or more substances of interest, detected particle densities of one or more substances of interest, or any combination thereof, associated with one or more portions of an environment received from sensor units 104. For example, a server 210 is configured to determine one or more detection events or mitigation actions based on one or more detections signals, detected particle counts of one or more substances of interest, detected particle densities of one or more substances of interest, or any combination thereof, associated with one or more portions of an environment received from sensor units 104.

According to embodiments, a server 210A includes or is otherwise connected to a machine-learning engine 218 configured to determine one or more baseline values, substance threshold values, or both based on one or more sets of historical air quality data. In embodiments, one or more sensor units 104 include or are otherwise connected to one or more machine-learning engines 218. A machine-learning engine includes, for example, hardware-based circuitry, software-based circuitry, or both configured to generate, train, and run one or more machine-learning models. For example, machine-learning engine 218 is configured to train one or more machine-learning models using one or more machine learning algorithms. Such machine-learning algorithms include, for example, supervised learning algorithms (e.g., linear regressions, decision trees, random forest, k-nearest neighbor, logistic regressions), unsupervised learning algorithms (e.g., Apriori, K-means), eager learning algorithms, lazy learning algorithms, reinforcement learning algorithms (e.g., Markov Decision Process), Naïve Bayes, Dimensionality Reduction algorithms, Gradient Boosting algorithms (e.g., GBM, XGBoost, LightGBM, CatBoos), or any combination thereof, to name a few. In embodiments, machine-learning engine 218 is configured to train and run one or more classifiers using, for example, one or more decision trees, Naïve Bayes classifiers, k-nearest neighbor classifiers, support vector machines, evolutionary algorithms, symbolic logic processing, artificial neural networks, or any combination thereof. According to embodiments, machine-learning engine 218 is configured to train and run one or more artificial neural networks, for example, modular neural networks, feedforward neural networks, radial basis function neural networks, Kohonen Self Organizing neural networks, recurrent neural networks, convolutional neural networks, or any combination thereof.

In embodiments, machine-learning engine 218 is configured to train one or more machine-learning models, classifiers, artificial neural networks, or any combination thereof using one or more training data sets, validation data sets, and test data sets. A training data set, for example, includes pairs of input data (e.g., vectors, scalars) and corresponding output data (e.g., vectors, scalars). Machine-learning engine 218 is configured to change or modify one or more parameters (e.g., weights of connections) of a machine-learning model based on the pairs of input and output data in one or more training data sets according to one or more machine-learning algorithms. A validation data set, for example, includes pairs of input data (e.g., vectors, scalars) and corresponding output data (e.g., vectors, scalars). Machine-learning engine 218 is configured to change or modify one or more hyper-parameters of a machine-learning model based on the pairs of input and output data in one or more validation data sets according to one or more machine-learning algorithms. A test data set, for example, includes pairs of predetermined input data (e.g., vectors, scalars) and corresponding target output data (e.g., vectors, scalars).

Machine-learning engine 218 is configured to determine one or more performance metrics (e.g., error rate) of a machine-learning model based on the pairs of predetermined input data and target output data of the test data set.

Using machine-learning engine 218, one or more servers 210 are configured to train and run one or more machine-learning models configured to determine one or more baseline values for one or more substances in an environment. In other words, machine-learning engine 218 is configured to generate a machine-learning model configured to receive data indicating one or more environments, locations within an environment, substances of interest, or any combination thereof as an input and output one or more baseline values for a substance of interest in the environment. These baseline values, for example, represent an ambient particle count, particle density, or both of a substance of interest in an environment when there are no emissions from any products or devices (e.g., a vaporization device, nicotine products) in the environment. According to embodiment, machine-learning engine 218 is configured to train such a machine-learning model using a baseline value training data set that includes data associated with a substance of interest in one or more sets of historical air quality data (e.g., detected particle counts of the substance of interest, detected particle densities of the substance of interest), data associated with the creation of one or more sets of historical air quality data (e.g., the time, environment, portion of an environment associated with the creation of the detected particles counts, detected particle densities, or both) stored in the building management system 200, labels associated with the sets of historical air quality data stored in the building management system 200, or any combination thereof. For example, such a baseline value training set includes detected particle counts and detected particle densities of a substance of interest and data indicating the times and portion of an environment associated with the creation of the detected particle counts and detected particle densities. Machine-learning engine 218 is configured to generate one or more baseline value training data sets relating to a substance of interest from historical air quality data by sorting, labeling, correlating, and relating at least a portion of the data in the historical air quality data. For example, machine-learning engine 218 filters a set of historical air quality data (e.g., detected particle counts, detected particle densities), data associated with the creation the set of historical air quality data, a training data set, or any combination thereof using one or more labels generated by machine-learning engine 218, labels stored in the building management system 200, or both to generate a baseline value training data set. As an example, machine-learning engine 218 filters out any data from a set of historical air quality data, data associated with the creation the set of historical air quality data, a training data set, or any combination thereof not associated with a baseline label. According to embodiments, to generate such baseline value training data sets, machine-learning engine 218 includes, runs, and trains, for example, a classifier configured to sort, label, correlate, and relate historical air quality data. After generating the baseline value training data sets relating to a substance of interest in an environment, machine learning engine 218 is configured to change the parameters of one or more machine-learning models based on the baseline value training data sets relating to a substance of interest in an environment and one or more machine-learning algorithms. In this way, machine-learning engine 218 generates a machine-learning model configured to receive data indicating one or more particle counts, particle densities, or both of a substance (e.g., from a set of historical air quality data) as an input and output one or more baseline values for a substance of interest in an environment.

According to embodiments, machine-learning engine 218 is configured to train and run one or more machine-learning models configured to determine one or more substance threshold values. That is to say, machine-learning engine 218 is configured to generate a machine-learning model configured to receive data indicating a substance of interest as an input and output one or more threshold particle counts or particle densities associated with a substance of interest. In embodiments, machine-learning engine 218 is configured to train a machine-learning model using a substance threshold training data set associated with substances of interest generated from one or more sets historical air quality data, data associated with the creation of the sets of historical air quality data (e.g., time, environment, location), one or more labels associated with the sets of historical air quality data, or any combination thereof stored in the building management system 200. Machine-learning engine 218 is configured to generate one or more substance threshold training data sets relating to a substance of interest from historical air quality data, data associated with the creation of the sets of historical air quality data (e.g., time, environment, location), or both by sorting, labeling, correlating, and relating at least a portion of the data in the historical air quality data. For example, machine-learning engine 218 labels historical air quality data relating to a specific substance of interest to form a substance threshold training data set. As another example, machine-learning engine 218 is configured to filter data from one or more sets of historical air quality data, data associated with the creation of the sets of historical air quality data, or both based on one or more labels generated by machine-learning engine 218, stored in building management system 200, or both to from a substance threshold training data set. As an additional example, machine-learning engine 218 is configured to filter out any data from one or more sets of historical air quality data, data associated with the creation of the sets of historical air quality data, or both not associated with a harmful label to generate a substance threshold training data set. According to embodiments, machine-learning engine 218 runs and trains a classifier to sort, label, correlate, and relate historical air quality data. After generating the substance threshold training data sets relating to a substance of interest, machine learning engine 218 is configured to change the parameters of one or more machine-learning models based on the substance threshold training data sets relating to a substance of interest and one or more machine-learning algorithms. In this way, machine-learning engine 218 generates a machine-learning model configured to receive data indicating a substance of interest as an input and output one or more threshold particle counts or particle densities associated with a substance of interest.

In embodiments, machine-learning engine 218 is configured to train and run one or more machine-learning models configured to determine one or more mitigation actions. That is to say, machine-learning engine 218 is configured to generate a machine-learning model configured to receive one or more detection signals, detected particle counts, detected particle densities, or any combination thereof, as an input and output one or more mitigation actions related to the input detection signals, detected particle counts, and detected particle densities. In embodiments, machine-learning engine 218 is configured to train a machine-learning model using a mitigation training data set associated with detection signals, detected particle counts, and detected particle densities generated from one or more sets of historical air quality data, data associated with the creation of the sets of historical air quality data (e.g., time, environment, location), historical mitigation data, one or more labels, or any combination thereof related to the respective detection signals, detected particle counts, and detected particle densities. Machine-learning engine 218 is configured to generate one or more mitigation training data sets relating to detection signals, detected particle counts, and detected particle densities from one or more sets of historical air quality data, data associated with the creation of the sets of historical air quality data, historical mitigation data, one or more labels, or any combination thereof by sorting, labeling, correlating, and relating at least a portion of the data in the historical air quality data, data associated with the creation of the sets of historical air quality data, historical mitigation data, one or more labels, or any combination thereof. For example, machine-learning engine 218 sorts and relates historical air quality data and historical mitigation data relating to a specific detected particle density using one or more labels generated by machine-learning engine 218, stored in building management system 200, or both to form a mitigation training data set. According to embodiments, machine-learning engine 218 runs and trains a classifier to sort, label, correlate, and relate the historical air quality data, historical mitigation data, or both. After generating the mitigation training data sets relating to respective detection signals, detected particle counts, and detected particle densities, machine learning engine 218 is configured to change the parameters of one or more machine-learning models based on the mitigation training data sets relating to respective detection signals, detected particle counts, and detected particle densities and one or more machine-learning algorithms. In this way, machine-learning engine 218 generates a machine-learning model configured to receive detection signals, detected particle counts, detected particle densities, or any combination thereof as inputs and output a mitigation action associated with the input detection signals, detected particle counts, and detected particle densities.

According to embodiments, machine-learning engine 218 is configured to train and run one or more machine-learning models configured to determine one or more environment analytics. The environment analytics include data representing one or more trends, predictions, likelihoods, or errors within one or more portions of an environment. For example, environment analytics include a trend in the frequency of detection events for one or more specific substances of interest within one or more portions of an environment, at one or more times (e.g., months, days of the week, hours), or both. As another example, environment analytics includes a prediction of a detection event for a specific substance of interest within one or more portions of an environment, times (e.g., months, days of the week, hours), or both. In embodiments, machine-learning engine 218 determines one or more trends, predictions, likelihoods, or any combination thereof by determining one or more means, medians, modes, patterns, changes, sequences, rates, or any combination thereof within one or more sets historical air quality data, data associated with the creation of the historical air quality data sets (e.g., time, environment, location), historical mitigation data, one or more labels, or any combination thereof. For example, machine-learning engine 218 determines one or more means, medians, modes, patterns, changes, sequences, rates, or any combination thereof within one or more sets historical air quality data, data associated with the creation of the historical air quality data sets, historical mitigation data, one or more labels, or any combination thereof for a predetermined amount of time (e.g., seconds, minutes, hours, days, weeks, months, years), within one or more predetermined areas of an environment, or both to form an analytic training data set. In embodiments, machine-learning engine 218 is configured to train a machine-learning model using an analytic training data set associated with the means, medians, modes, patterns, changes, sequences, rates, or any combination thereof, generated from one or more sets of historical air quality data, data associated with the creation of the historical air quality data sets, historical mitigation data, one or more labels, or any combination thereof related to a specific substance of interest. Machine-learning engine 218 is configured to generate one or more analytic training data sets relating to means, medians, modes, patterns, changes, sequences, and rates from the sets historical air quality data, data associated with the creation of the historical air quality data sets, historical mitigation data, one or more labels, or any combination thereof by sorting, labeling, correlating, and relating at least a portion of the data in the historical air quality data, historical mitigation data, or both. For example, machine-learning engine 218 sorts and relates historical air quality data and historical mitigation data relating to a specific detected particle density to form an analytic data set. According to embodiments, machine-learning engine 218 runs and trains a classifier to sort, label, correlate, and relate the historical air quality data, historical mitigation data, or both. After generating the analytic training data sets relating to respective means, medians, modes, patterns, changes, sequences, rates, or any combination thereof, machine learning engine 218 is configured to change the parameters of one or more machine-learning models based on the analytic training data sets relating to respective medians, modes, means, rates, or any combination thereof and one or more machine-learning algorithms. In this way, machine-learning engine 218 generates a machine-learning model configured to receive means, medians, modes, patterns, changes, sequences, rates, or any combination thereof, as inputs and output environment analytics that include, for example, trends, predictions, likelihoods, or errors within one or more portions of an environment.

A server 210 further includes notification engine 216 including hardware and software configured to generate one or more notifications based on one or more received detection signals, detected particle counts, and detected particle densities, one or more generated mitigation actions, one or more determined detection events, or any combination thereof. For example, in response to receiving a detection signal, notification engine 216 is configured to generate one or more notifications. A notification includes data indicating a portion of the environment, substance of interest, particle count, particle density, or any combination thereof, associated with one or more received detection signals, detected particle counts, and detected particle densities, one or more generated mitigation actions, one or more determined detection events, or any combination thereof. According to embodiments, a notification includes data configured to be displayed on one or more display devices (e.g., monitors, smartphones, computers, laptops, televisions). In embodiments, servers 210 are configured to transmit one or more notifications to one or more user devices (e.g., computers, smartphones, laptop computers, tablets), one or more application programming interactions (APIS), building management systems, or any combination thereof. For example, servers 210 transmit one or more notifications using network 104. In embodiments, notifications also include one or more mitigation actions, for example, one or more user prompts.

For example, a notification includes a user prompt to open a window in a specified portion of the environment.

According to embodiments, notification engine 216 is configured to associate data from a detection signal, mitigation action, or both with data from one or more building systems 220. For example, notification engine 216 is configured to associate data from one or more building systems 220 detected at a time indicated by a detection signal, mitigation action (e.g., the time the mitigation action was created), or both, or within a predetermined time threshold from the time indicated by a detection signal, mitigation action, or both. As another example, notification engine 216 is configured to associate data from one or more building system 220 within a predetermined distance threshold from a portion of the environment indicated by a detection signal, mitigation action, or both. Notification engine 216 associates the data using pointers, tables, databases, or any combination thereof. In embodiments, notification engine 216 includes associated data from one or more building systems 200 in one or more notifications. As an example, notification engine 216 is configured to include at least a portion of security footage from security system 222 detected at or near a time indicated by a detection signal in one or more notifications indicating data from the detection signal. As another example, notification engine 216 is configured to include a status of an air filter from HVAC system 226 at a portion of the environment indicated by a detection signal in one or more notifications indicating data from the detection signal.

Figure 3:
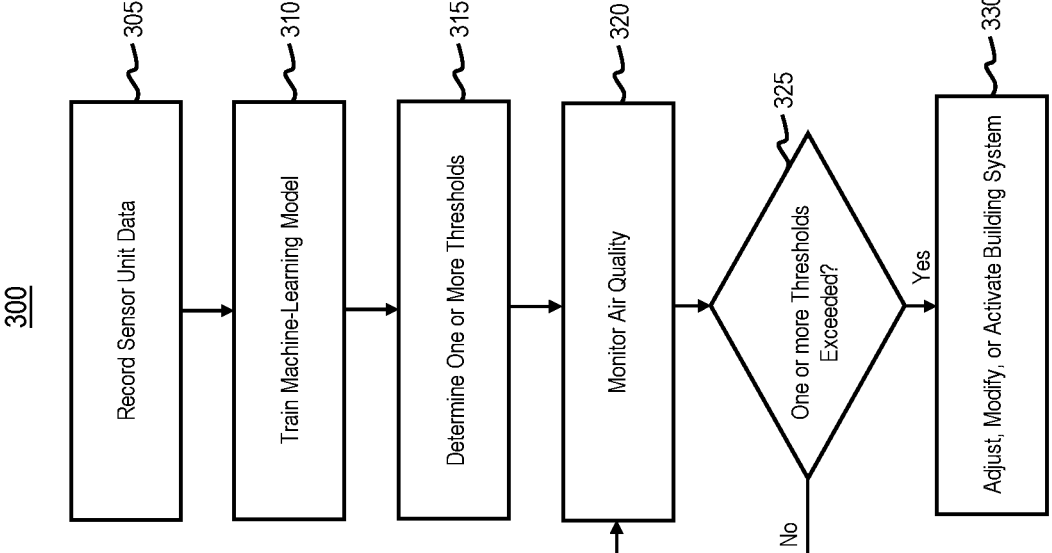
FIG. 3 illustrates a flow diagram of an example process for performing a mitigation action, according to embodiments.

Referring now to FIG. 3, a flow diagram of an example process 300 for performing a mitigation action is illustrated. At block 305, air quality data (e.g., particle densities and particles counts of substances of interest) from one or more sensor units, the same as or similar to sensor units 104, is recorded in one or more databases, the same as or similar to databases 112, as one or more sets of historical air quality data. At block 310, a machine-learning engine, the same as or similar to machine-learning engine 218, is configured to train a machine-learning model using the sets of historical air quality data. For example, the machine-learning engine is configured to generate one or more substance threshold training data sets related to a specific substance of interest from the sets of historical air quality data by sorting, labeling, correlating, relating, or any combination thereof, at least a portion of the data in the historical air quality data related to the specific substance of interest. Once the substance threshold training data sets are generated, the machine-learning engine trains a machine-learning model based on the substance threshold training data sets and one or more machine-learning algorithms. For example, the machine-learning engine adjusts one or more parameters of the machine-learning model based on the substance threshold training data sets.

At block 315, one or more substance threshold values are determined from the trained machine-learning model. For example, a substance of interest is provided as an input to the trained machine-learning model. In response to receiving the substance of interest as an input, the trained machine-learning model is configured to determine one or more substance threshold values. At block 320, the air quality of one or more portions of an environment is monitored by one or more sensor units. For example, the sensor units monitor the particle count and particle density of the substance of interest in one or more portions of the environment. At block 325, the system determines whether the air quality monitored by the sensor units exceeds the threshold values determined at block 315. That is to say, the system determines whether the particle count and particle density of the substance of interest in one or more portions of the environment exceed the threshold values determined at block 315. In response to the air quality not exceeding the threshold values, the system moves back to block 320. In response to the air quality exceeding the threshold values, the system moves to block 330. At block 330, the system determines a mitigation action based on the monitored air quality. That is to say, the system determines a mitigation action based on the particle count and particle density of the substance of interest in one or more portions of the environment. Based on the mitigation action, the system adjusts, modifies, or activates one or more building systems, the same as or similar to building systems 220.

Figure 4:
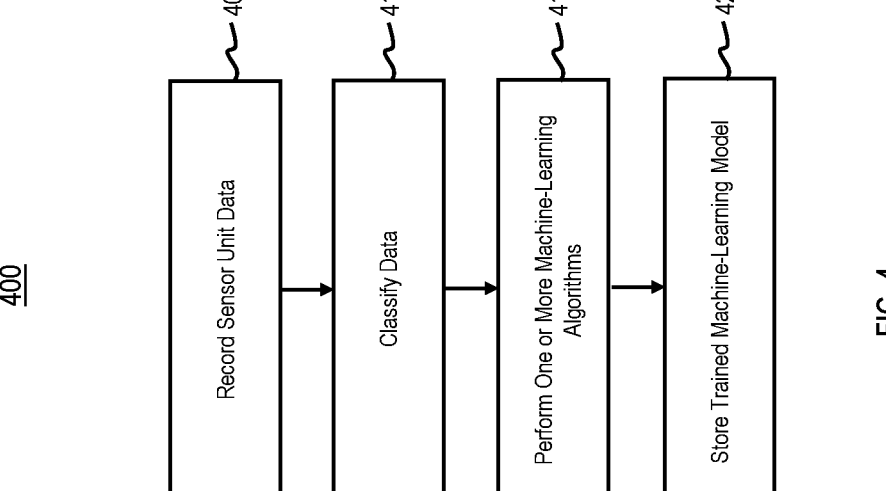
FIG. 4 illustrates an example process for training a machine-learning model for managing one or more building systems based on air quality, according to embodiments.

Referring now to FIG. 4, a flow diagram of an example process 400 for training a machine-learning model is presented. At block 405, air quality data (e.g., particle densities and particles counts of substances of interest) from one or more sensor units, the same as or similar to sensor units 104, is recorded in one or more databases, the same as or similar to databases 112, as one or more sets of historical air quality data. At block 410, a machine-learning engine, the same as or similar to machine-learning engine 218, sorts, correlates, labels, and relates the sets of historical air quality data associated with a specific substance of interest. In other words, the machine-learning engine generates one or more training data sets (e.g., substance threshold training data sets, baseline value training data sets, mitigation training data sets, analytic training data sets) from the historical air quality data by sorting, correlating, labeling, and relating the historical air quality data associated with a specific substance of interest. At block 415, the machine-learning engine trains the machine-learning model based on the training data sets. For example, the machine-learning engine changes one or more parameters of a machine-learning models based on the training data sets and one or more machine-learning algorithms. At block 425, the machine-learning engine stores the trained machine-learning model in one or more memories or databases.

Figure 5:
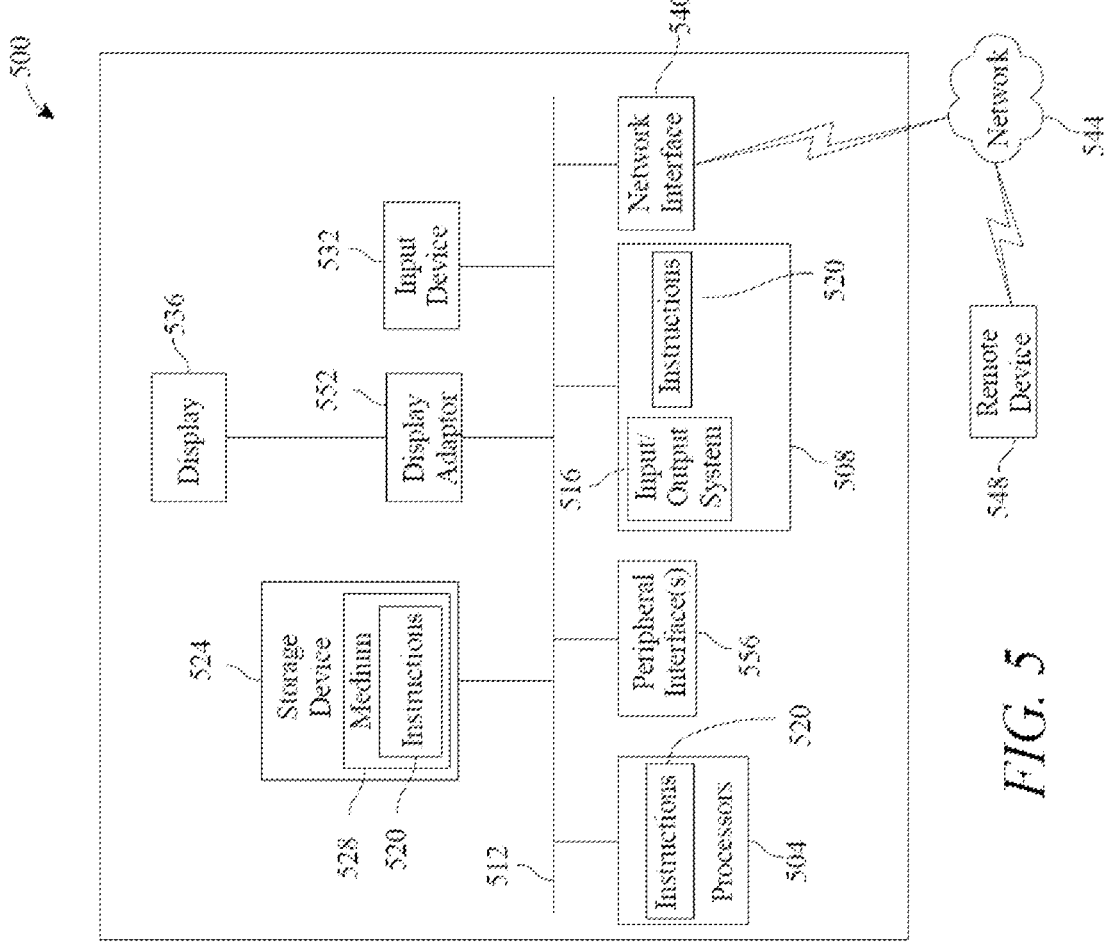
FIG. 5 illustrates a block diagram of a computing device in the example form of a computer system, according to embodiments The drawings are not necessarily to scale and may be illustrated by phantom lines, diagrammatic representations, and fragmentary views. In certain instances, details that are not necessary for an understanding of the embodiments or that render other details difficult to perceive may have been omitted.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read-only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device, a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A method, comprising:
training a first machine-learning model using a first training data set associated with an environment such that the first machine learning model is configured to receive data indicating a location within the environment as an input and output a baseline value for an aerosolized substance of interest;

training a second machine-learning model according to the first training data set such that the second machine-learning model is configured to receive data indicating the aerosolized substance of interest as an input and output a substance threshold value based on the first training data set;

activating, at the location in the environment, a chemical sensor;

monitoring, by the chemical sensor, a presence of the aerosolized substance of interest based on the baseline value; and in response to detecting the presence of the substance of interest by the chemical sensor, modifying a building system associated with the location of the environment based on the aerosolized substance.

2. The method of any of claim 1, further comprising:
generating a second training data set from historical air quality data; and training a third machine-learning model according to the second training data set such that the third machine-learning model is configured to receive a particle count of the aerosolized substance as an input and output a mitigation action including an adjustment associated with the building system.

3. The method of claim 2, wherein modifying the building system is further based on the adjustment.

4. The method of claim 1, further comprising:
determining a particle count of the aerosolized substance of interest in response to detecting the presence of the substance of interest by the chemical sensor.

5. The method of claim 4, further comprising:
in response to the particle count of the aerosolized substance of interest exceeding the substance threshold value, adjusting a second building system associated with a second location in the environment.

6. A method, comprising:
classifying a historical air quality data associated with an air quality detection system at an environment so as to produce a first training data set;

training a first machine-learning model using the first training data set such that the first machine learning model is configured to receive data indicating a location in the environment as an input and output baseline value;

training a second machine-learning model according to the first training data set such that the second machine-learning model is configured to receive data indicating a certain aerosolized substance as an input and output a threshold value based on the first training data set;

determining, by at least a portion of the air quality detection system, a particle count of the certain aerosolized substance at the location in the environment; and in response to the particle count of the certain aerosolized substance exceeding the threshold value, adjusting a building management system associated with the environment.

7. The method of claim 6, further comprising:
in response to the particle count of the certain aerosolized substance exceeding the threshold value, modifying a second building management system associated with the environment.

8. The method of claim 6, wherein the first training data set includes correlations of a plurality of particle counts of the certain aerosolized substance to respective ones of a plurality of thresholds.

9. The method of claim 6, further comprising:

determining an activation event, wherein determining the particle count of the certain aerosolized substance is in response to the determined activation event.

10. The method of claim 6, wherein the environment comprises one of a school, warehouse, or office building.

11. The method of any of claim 6, wherein the building system comprises one of a security system, fire system, HVAC system, or power system.

12. The method of any claim 6, further comprising:

capturing a video of the location in the environment; and associating the video with the certain aerosolized substance based on the particle count of the certain aerosolized substance exceeding the threshold value.

13. The method of any of claim 6, further comprising: generating an alarm associated with the building management system in response to the particle count of the certain aerosolized substance exceeding the threshold value.

14. An air quality system comprising:

an air quality sensor disposed at a first location in an environment and configured to determine a particle count of a certain aerosolized substance at the first location in the environment; and a server including at least one processor configured to:

classify a historical air quality data associated with the environment so as to produce a first training data set;

train a first machine-learning model using the first training data set such that the first machine learning model is configured to receive data indicating the location in the environment as an input and output a baseline value; and train a second machine-learning model according to the first training data set such that the second machine-learning model is configured to receive data indicating the certain aerosolized substance as an input and output a substance threshold value based on the first training data set;

in response to the particle count of the certain aerosolized substance exceeding the threshold value, modify a building system associated with the first location in the environment based on the aerosolized substance.

15. The air quality system of claim 14, wherein the at least one processor is further configured to:

generate a second training data set from the historical air quality data; and train a third machine-learning model according to the second training data set such that the third machine-learning model is configured to receive the particle count of the certain aerosolized substance as an input and output a mitigation action including an adjustment of the building system.

16. The air quality system of claim 15, wherein the at least one processor is further configured to:

modify the building system based on the adjustment.

17. The air quality system of claim 14, wherein the at least one processor is further configured to:

determine an entry into the first environment, wherein the air quality sensor is configured to determine the particle count of the certain aerosolized substance is in response to determining the entry.

* * * * *